J. R. WELCH.
LAMINATED METAL WHEEL SPOKE.
APPLICATION FILED DEC. 19, 1906.

900,049.

Patented Sept. 29, 1908.

WITNESSES:
J. H. Gardner.
M. D. Beaty.

INVENTOR:
John R. Welch,
BY E. T. Silvius,
ATTORNEY.

UNITED STATES PATENT OFFICE.

JOHN R. WELCH, OF ALEXANDRIA, INDIANA, ASSIGNOR, BY MESNE ASSIGNMENTS, TO THE AMERICAN STEEL WHEEL COMPANY, OF ALEXANDRIA, INDIANA, A CORPORATION OF INDIANA.

LAMINATED METAL WHEEL-SPOKE.

No. 900,049.  Specification of Letters Patent.  Patented Sept. 29, 1908.

Application filed December 19, 1906. Serial No. 348,538.

*To all whom it may concern:*

Be it known that I, JOHN R. WELCH, a citizen of the United States, residing at Alexandria, in the county of Madison and State of Indiana, have invented certain new and useful Improvements in Laminated Metal Wheel-Spokes; and I do declare the following to be a full, clear, and exact description of the invention, reference being had to the accompanying drawings, and to the letters and figures of reference marked thereon, which form a part of this specification.

This invention relates to hollow sheet metal wheel spokes having the main body parts and the hub ends or tenons formed integrally and provided with a one piece tenon end for connection with the felly of the wheel, the invention having reference more particularly to the laminated main body part and the hub end of a spoke.

The object of the invention is to provide a very strong spoke which may be built up of such thin metal as will permit of the formation of turned over and lapped hook seams longitudinally of the spokes.

With the above-mentioned and minor objects in view, the invention consists in a hollow metal spoke comprising a laminated main body part and spoke end, and a separate tenon end attached to the body part for connection with the wheel felly; and, the invention consists further in the novel parts and combinations and arrangements of parts as hereinafter particularly described and claimed.

Figure 1:
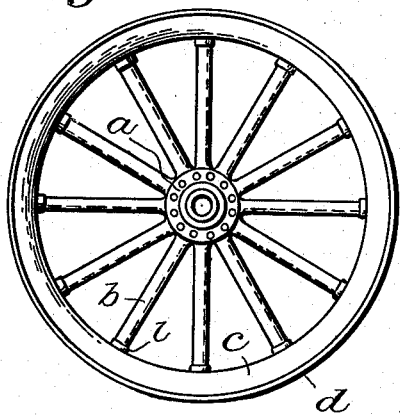
Figure 2:
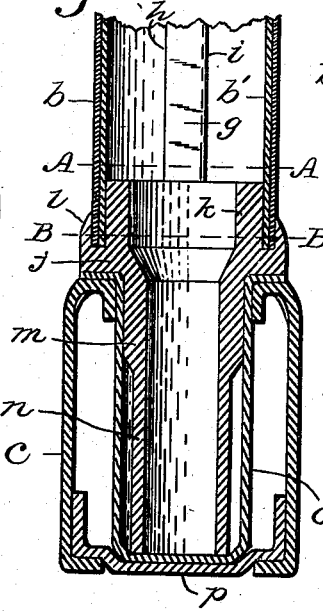
Figure 3:
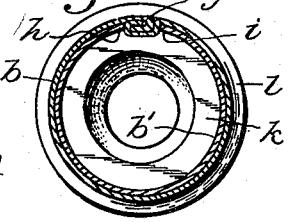
Figure 4:
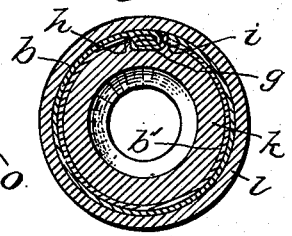
Figure 5:
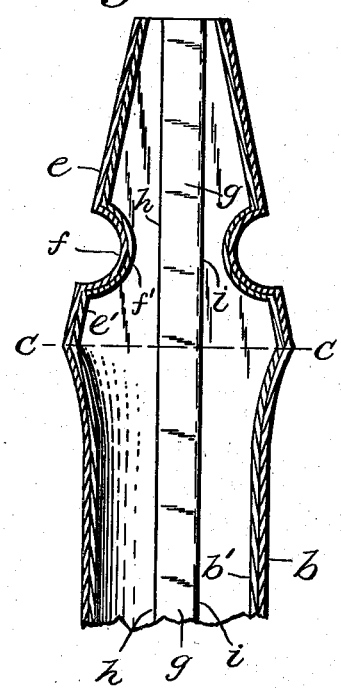
Figure 6:
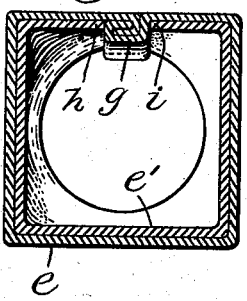
Figure 7:
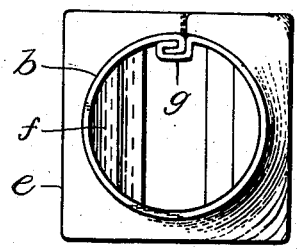
Figure 8:
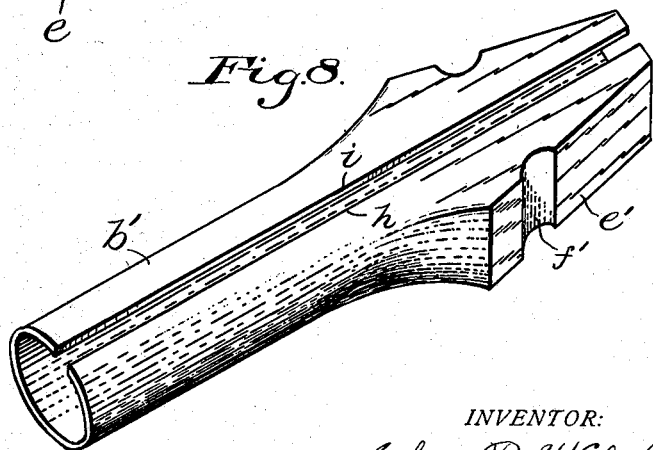

Referring to the drawings Figure 1 is an elevation of a wheel having the improved spoke embodied therein; Fig. 2, a fragmentary longitudinal sectional view showing the tenon end connected to the wheel felly, the latter being in cross-section and a portion of the main body part of the spoke attached to the tenon end; Fig. 3, a transverse sectional view of the spoke on the line A A in Fig. 2; Fig. 4, a transverse sectional view of the spoke on the line B B in Fig. 2; Fig. 5, a fragmentary longitudinal sectional view showing a portion of the main body part and the tenon end adapted to be connected to the wheel hub; Fig. 6, a transverse sectional view of the spoke on the plane of the line C C in Fig. 5; Fig. 7, an end view of the external or shell part of the spoke viewed at the end that is adapted to connect with the separate tenon end; and, Fig. 8 is a perspective view of the internal part of the laminated portion of the spoke.

Similar reference characters in the various figures of the drawings designate like elements or features of construction.

In the drawings $a$ designates a wheel hub; $b$, the external part of the laminated main body part of the spoke; $c$, the wheel felly; and, $d$, the tire of the wheel.

In constructing the improved spoke, the external part $b$ of the body part of the spoke is composed of comparatively thin sheet metal rolled, so as to be tubular, from a strip of the metal, and the two edges of the strip joined together by a suitable form of lock seam, the exterior of the part $b$ being relatively smooth and the seam metal standing up on the inner side of the part. The spoke comprises a tenon end $e$ formed integral with the body part $b$, and adapted to be attached to the wheel hub, the hub end having inwardly curved parts $f$ to clear the hub bolts as usual, said seam of the shell, indicated by $g$, extending along the body part $b$ and throughout the length of the hub end or tenon end $e$, the external contour of which is wedge shape, as will be understood. The internal part $b'$ is formed of a relatively thin metal strip turned over to fit into the body part $b$, without the edges $h$ and $i$ of the part meeting but abutting against opposite sides of the seam $g$, this internal part having a wedge shaped tenon part $e'$ formed integrally and fitting into the tenon part $e$, there being inwardly curved parts $f''$ fitting close to the parts $f$, and the whole internal part is inserted into and brazed to the external or main parts of the integral main body part and hub end part.

The tenon part for connection with the felly, may be formed in various ways but preferably comprises a single piece which may be either forged or cast and having a main body part $j$, having an annular projection $k$ fitting into the internal part $b'$ of the spoke, and an external flange or collar $l$ fitting around the end of the body part $b$, all being suitably secured together as by brazing and otherwise if desired. A tenon projects from the main part $j$ and comprises a cylindrical part $m$, and a relatively smaller cylindrical part $n$, for insertion into the sockets of the felly, the sockets usually having thimbles $o$ therein. The periphery of the felly $c$ usually has a band $p$ forming a tread in contact with the ends of the spoke tenons.

It is to be understood that the longitudinal seam $g$ of the external or main parts $b$ and $e$, may be variously modified in construction, but in any case will stand up on the inner side of the spoke, and the internal parts $b'$ and $e'$ will extend from one side of the seam around the spoke to the opposite side of the seam and be brazed thereto. It is to be understood also that while the laminated portions of the spoke are shown as having two thicknesses or layers of metal, it will be obvious that one or more layers may be placed inside of the inner parts, so as to abut against the longitudinal seam.

In assembling the different parts of the wheel, the parts $n$ of the tenon ought to be inserted obliquely into the sockets of the felly which will be continuous, and then while connecting the hub with the spokes, the latter will be forced longitudinally so that the parts $m$ of the tenon will be forced into the sockets.

In practical use the laminated portions of the spoke will be found to be very stiff, yet not heavy and not liable to become dented in minor accidents, and the spokes may be removed, if necessary, from the hub and the felly and replaced by new spokes.

I am aware that it is not new to make laminated articles of metal and do not broadly claim such construction, but I am not aware of wheel spokes formed of laminated metal throughout from the tenon end of the felly and the end of the spoke that connects with the hub of the wheel.

Having thus fully described the invention, what I claim as new and desire to secure by Letters Patent is—

1. In a laminated metal wheel spoke, the combination of an outer part with an internal longitudinal joint seam, an inner layer extending from one side of the seam along the outer part to the opposite side of the seam and attached to said outer part and the seam thereof, and a tenon end part attached to said outer part and said inner layer.

2. In a laminated metal wheel spoke, the combination of a tenon end part, an outer tubular part with an internal longitudinal joint seam, and an inner layer extending from one side of the seam along the tubular part to the opposite side of the seam and attached to said tubular part and the seam thereof and attached also to said end part, said tubular part being attached also to said end part.

3. In a laminated metal wheel spoke, the combination of a tenon end part, an outer tubular main part with an internal joint seam, and an inner layer extending from one side of the seam along the outer part to the opposite side of the seam and having the inner side thereof attached to the tenon end part, said inner layer being attached to the said main part and to the seam thereof, and said tenon end part having a collar attached to the outer side of said main part, substantially as set forth.

4. In a laminated metal wheel spoke, the combination of a tenon end part, an outer tubular main part with an internal longitudinal joint seam, and an inner layer extending from one side of the seam along the main part to the opposite side of the seam and having the inner side thereof attached to the tenon end part, said inner layer being attached to the said main part and to the seam thereof.

5. In a laminated metal wheel spoke, the combination of a tenon end part, an outer tubular main part with an internal longitudinal joint seam, and an inner layer extending from one side of the seam along the main part to the opposite side of the seam and joined to the tenon end part, said inner layer being attached to the said main part and to the seam thereof, and said tenon end part having a collar attached to the outer side of said main part.

6. In a laminated metal wheel spoke, the combination of an outer tubular main part and integral wedge-shaped end part with an internal longitudinal joint seam, an inner layer extending from one side of the seam along the main part and continuously along the wedge-shaped end part to the opposite side of the seam, portions of said inner layer being attached to said end part and other portions being attached to said main part, said layer being attached throughout its length to said seam, and a tenon end part attached to said main part and said layer.

In testimony whereof, I affix my signature in presence of two witnesses.

JOHN R. WELCH.

Witnesses:
A. A. GALLMAN,
J. G. BROWNMAN.